United States Patent Office 3,708,434
Patented Jan. 2, 1973

3,708,434
CHROMIUM MOLYBDATE, TELLURIUM OXIDE, PHOSPHORUS OXIDE CATALYST
Jamal S. Eden, Akron, Ohio, assignor to The B. F. Goodrich Company, New York, N.Y.
No Drawing. Original application May 2, 1968, Ser. No. 726,218. Divided and this application Nov. 2, 1970, Ser. No. 86,385
Int. Cl. B01j 11/82
U.S. Cl. 252—435     3 Claims

ABSTRACT OF THE DISCLOSURE

Unsaturated acids and aldehydes as acrylic acid and acrolein or methacrylic acid and methacrolein are prepared in excellent yields and at improved rates by the oxidation of an olefin as propylene or isobutylene in the presence of a catalyst containing chromium molybdate, tellurium oxide and phosphorus oxide.

BACKGROUND OF THE INVENTION

This is a division of application Ser. No. 726,218 filed May 2, 1968.

Catalysts containing chromium oxide have been proposed for preparing unsaturated aldehydes and unsaturated carboxylic acids by oxidation of olefins at an elevated temperature. Using such catalysts, the contact times required for suitable conversion of feed stock to the desired products in good efficiency have been longer than desired. This requires larger equipment per unit of product and represents loss of feed and desired products.

SUMMARY OF THE INVENTION

I have now found that when olefins such as propylene or isobutylene are reacted with oxygen at an elevated temperature in the presence of a catalyst; initially containing chromium molybdate, tellurium oxide and phosphorus pentoxide, that excellent conversion and yield of propylene to acrylic acid and acrolein are obtained at very short contact times.

DETAILED DESCRIPTION

The reactants for providing aldehydes and acids are propylene or isobutylene, a molecular oxygen-containing gas which can be pure oxygen, oxygen diluted with an inert gas, oxygen enriched air or air per se.

Stoichiometric ratios of oxygen to olefin for the purposes of this invention are 1.5:1. While lower ratios of oxygen can be used at a sacrifice of yield, it is preferred to use an excess of oxygen. Large excesses of oxygen while not undesirable, introduce process problems and an amount of oxygen from about 2 to about 4 mols of oxygen per mol of olefin is an adequate range.

The use of steam in the reaction while desirable is not absolutely essential. The amount of steam used may be varied from about 0 to 10 or more mols per mol of olefin. Other diluent gases such as nitrogen, saturated hydrocarbons such as propane may be used if desired.

The reaction may be carried out in either fixed or fluidized catalyst bed.

The reaction temperature can range from about 300° C. to about 550° C. A preferred range is from about 350° C. to about 450° C.

The contact time may vary considerably in the range of greater than 0.1 second. Good results have been obtained within the range of about 2 to about 60 seconds. While advantage may be taken of the short contact time, longer times may be used if desired. Advantage may be taken of the high conversion rate and much lower temperatures may be used at reasonable contact times impossible with known catalyst systems.

The reaction may be conducted at atmospheric pressure, in a partial vacuum, or under induced pressures up to 100 p.s.i. or higher. Atmospheric pressure is preferred for fixed bed systems and higher pressures for fluid bed reactions.

The particle size of the catalyst for fixed bed operations may be from about 10 to 18 mesh. Larger and smaller size particles may be used in fixed beds if desired. For fluid bed operations, catalyst size normally will range from about 80 to 325 mesh (U.S. Sieve).

The active catalyst containing chromium molybdate, tellurium oxide and phosphorus oxide may be prepared by a number of methods and may be supported or unsupported. The catalyst ingredients may be mixed in the form of solution or slurries, or can be dry blended. Supported catalysts may be prepared by adding a dry support or aqueous slurry thereof to the catalyst ingredients. Among suitable supports are silica, silica-containing alumina, titanium oxide, materials such as diatomaceous earth, kieselguhr, silicon carbide, clay, aluminum oxides and the like.

An unsupported catalyst used in the examples herein was prepared by dissolving 132.45 grams of ammonium molybdate in 250 ml. of water. 90 grams of $NH_4OH$ was added and the mixture heated for 2 hours at 80° C. 133.24 grams of $CrCl_3 \cdot 6H_2O$ dissolved in 200 ml. of water was added to the ammonium molybdate solution. The resulting $Cr_2(MoO_4)_3$ was filtered, washed and reslurried in water and the slurry mixed with 72 grams of ammonium tellurate and 67.8 grams of 85% $H_3PO_4$. The resulting mixture was evaporated to dryness on a steam bath and calcined in a hot tube oven for 16 hours at 400 to 425° C. The catalyst was ground to a mesh size of 10 to 18 mesh (U.S. Sieve). This catalyst contains chromium molybdate, tellurium oxide and phosphorus pentoxide in a molar ratio of 1:1:1. Alternatively, powdered chromium molybdate and ammonium tellurate may be mixed with phosphoric acid, a dry support added thereto if desired, and dried.

A supported catalyst was prepared by mixing a water slurry containing 0.0625 mol of $Cr_2(MoO_4)_3$ prepared from ammonium molybdate and chromium nitrate with 323 grams of finely divided low surface silica alumina in 350 ml. of water. A slurry containing 19.7 grams of ammonium tellurate was added to this mixture and 14.4 grams of 85% phosphoric acid. The mix was dried and calcined at 400–425° for 16 hours, cooled and powdered to a mesh size of 80 to 325 for fluid bed operations. The catalyst contains 16% actives on the silica-alumina and has a molar ratio of 1:1:1 of $Cr_2(MoO_4)_3:TeO_2:P_2O_5$.

EXAMPLES

Runs were made in a fixed bed reactor of a high silica (Vycor) glass tube 12″ long and 30 mm. outer diameter. The reactor had inlets for air, steam and propylene. External electrically operated heating coils were wound on the reactor. Outlet vapors were passed through a water cooled condenser and the uncondensed gases were passed through a gas chromatograph and analyzed continuously. The liquid condensate was weighed and analyzed for unsaturated acid and aldehyde in the gas chromatograph. 170 ml. of catalyst prepared as described above and containing $Cr_2(MoO_4)_3$. $TeO_2$ and $P_2O_5$ in a molar ratio of 1:1:1 was placed in the reactor. Steam at a temperature of 200 to 250° C. was first fed into the reactor, and thereafter propylene and air were separately fed into the reactor from preheaters at a temperature of about 200 to 250° C. Before the propylene was added, the reactor was preheated to about 285° C. The molar ratio of reactants used was one mol of propylene and 4.2 mols of steam and 3.04 mols of oxygen (air). The reaction temperature, contact time (calculated at room temperature and pressure), conversion and yield in the several runs are set forth in the table below.

| Run | Temperature, °C. | Contact time, seconds | Mol percent propylene converted | Mol percent yield on propylene converted | |
|---|---|---|---|---|---|
| | | | | Acr. | AA. |
| 1 | 435 | 5.3 | 96.81 | 33.37 | 44.56 |
| 2 | 455 | 5.3 | 99.56 | 24.06 | 50.53 |
| 3 | 455 | 4 | 93.82 | 42.33 | 34.62 |
| 4 | 430 | 10.8 | 100 | 11.02 | 58.42 |
| 5 | 395 | 14 | 100 | 10.96 | 59.48 |
| 6 | 385 | 46 | 100 | 7.06 | 48.05 |

With only 15 ml. catalyst in the reactor, at 430° C. and a contact time of only 2.1 seconds, a conversion of 100% was obtained for a yield of 25.96% of acrolein and 53.02% acrylic acid.

With the supported catalyst described above in a fluid bed reactor at 430° C. and a contact time of 21.6 seconds, conversion was 94.59% and the yields of acrolein and acrylic acid were 49.12% and 35.49%.

With another catalyst containing a molar ratio of $Cr_2(MoO_4)_3$:$TeO_2$:$P_2O_5$ of 1:2:1, in a fixed bed at 14 seconds and 405° C., a conversion of 96.98% was obtained and 56.55% acrolein and 30.28% acrylic acid.

Higher yields of acrylic acid were obtained with a catalyst having in a molar ratio 1:2:2. Good yields of methacrylic acid at good conversion rates are obtained with isobutylene.

I claim:
1. A catalyst consisting essentially of chromium molybdate, tellurium oxide and phosphorus oxide in a molar ratio of 1–10:1–10:1–10.
2. A catalyst of claim 1 consisting essentially of $Cr_2(MoO_4)_3$, $TeO_2$ and $P_2O_5$ in a molar ratio of 1:1–2:1–2.
3. A catalyst of claim 2 on a silica support.

References Cited

UNITED STATES PATENTS

| 3,228,890 | 1/1966 | Eden | 252—437 |
| 3,522,193 | 7/1970 | Eden | 252—435 |
| 3,254,110 | 5/1966 | Sennenald et al. | 252—437 X |
| 3,518,295 | 6/1970 | Eden | 252—435 X |

FOREIGN PATENTS

| 1,063,332 | 3/1967 | Great Britain | 260—533 N |

PATRICK P. GARVIN, Primary Examiner

U.S. Cl. X.R

252—437; 260—533 N, 604 R